Feb. 20, 1940.  H. J. DE N. McCOLLUM  2,191,178
AUTOMOBILE HEATER
Original Filed Jan. 28, 1936  4 Sheets-Sheet 1
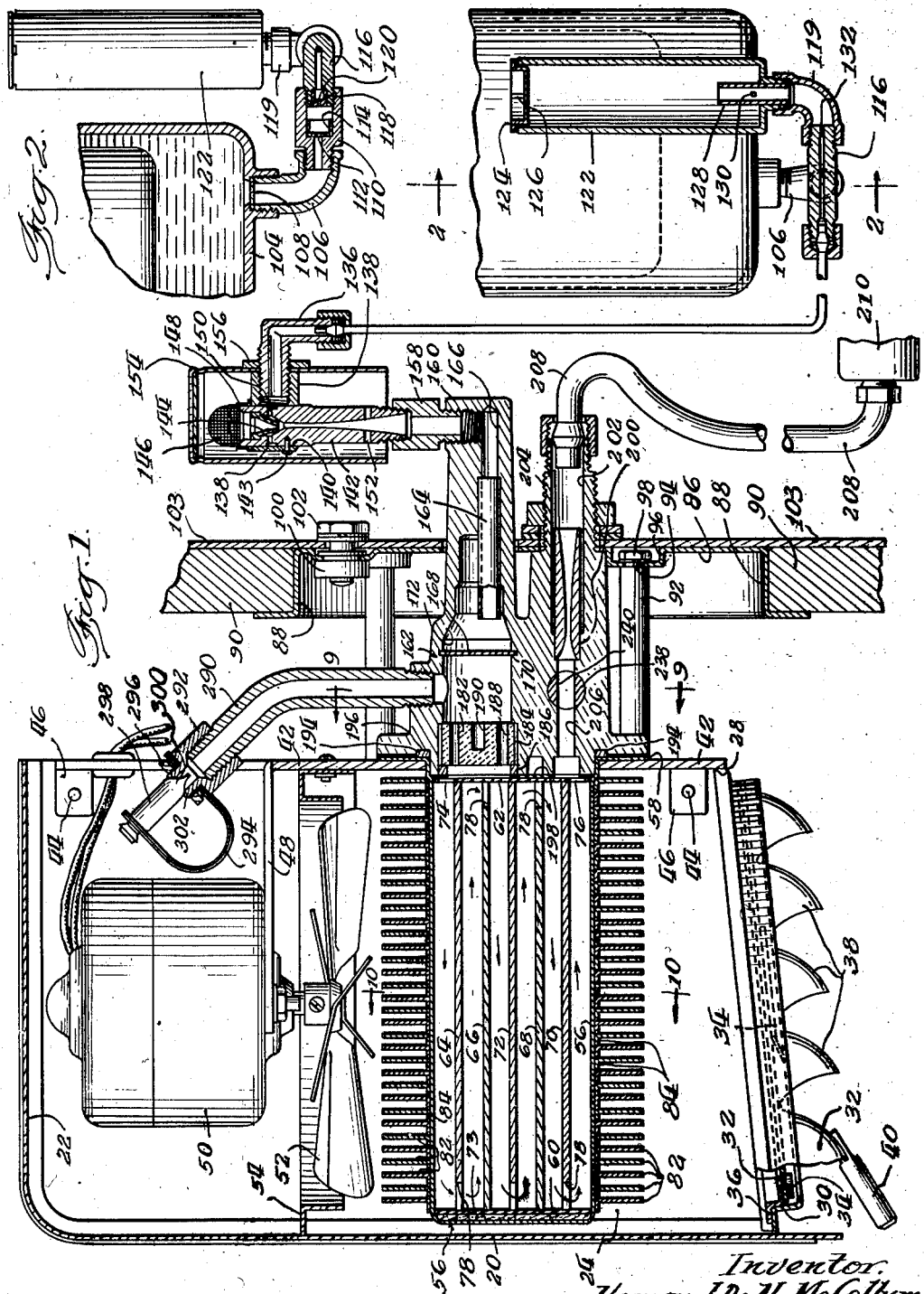

Feb. 20, 1940. H. J. DE N. McCOLLUM 2,191,178
AUTOMOBILE HEATER
Original Filed Jan. 28, 1936 4 Sheets-Sheet 2
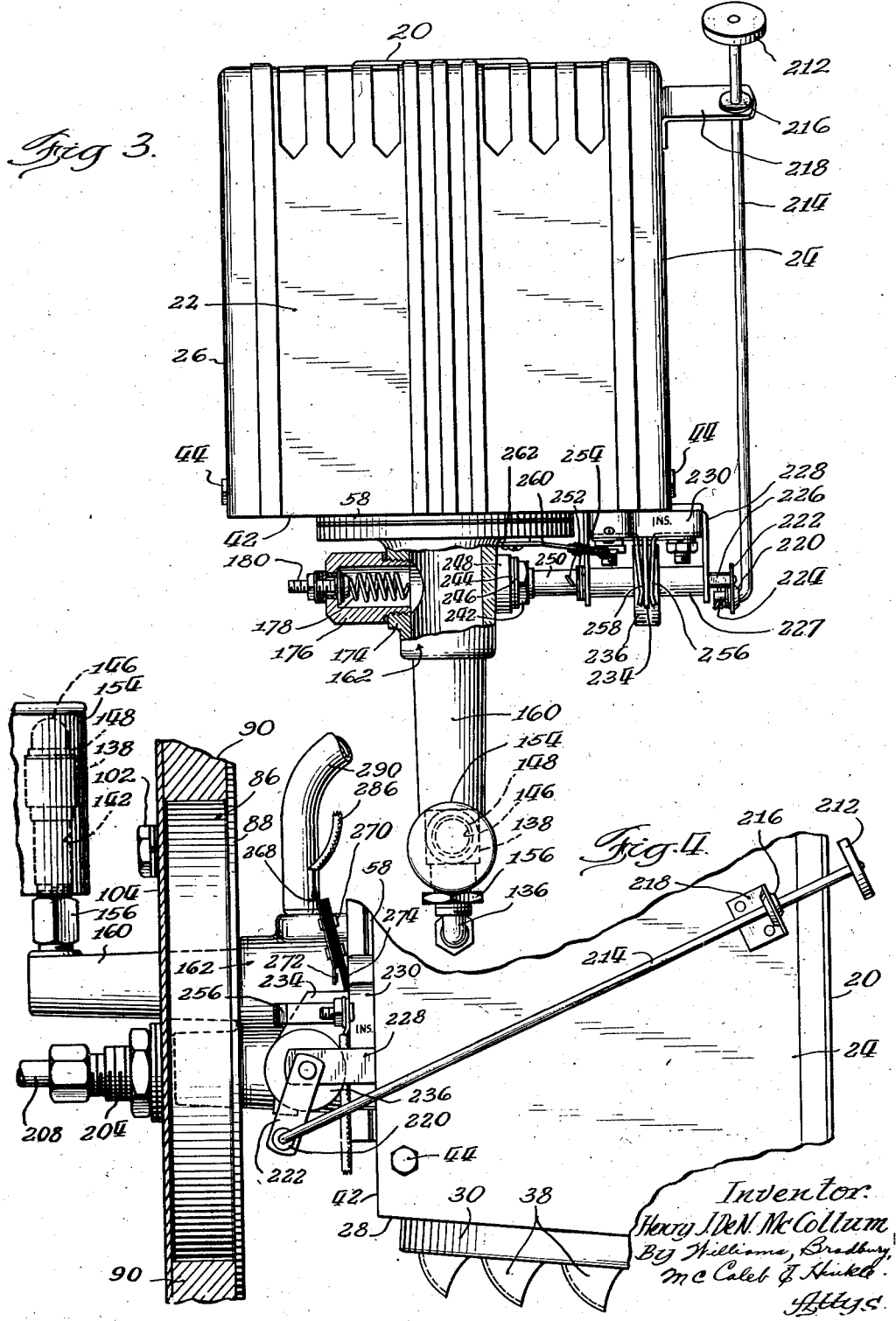

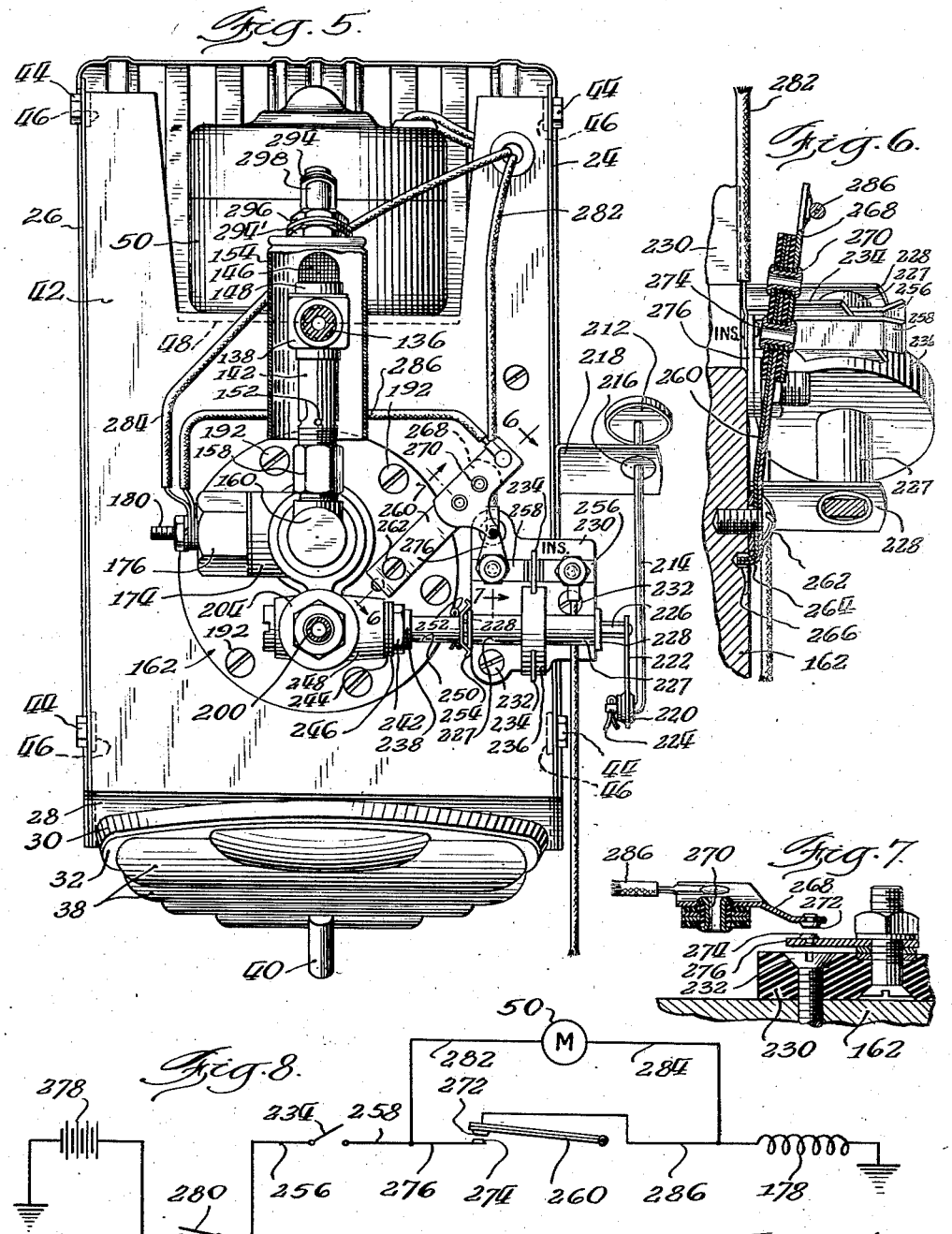

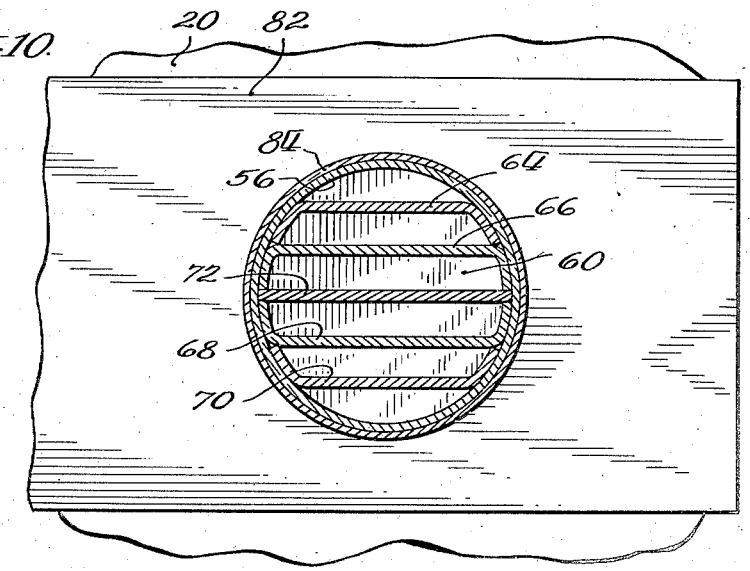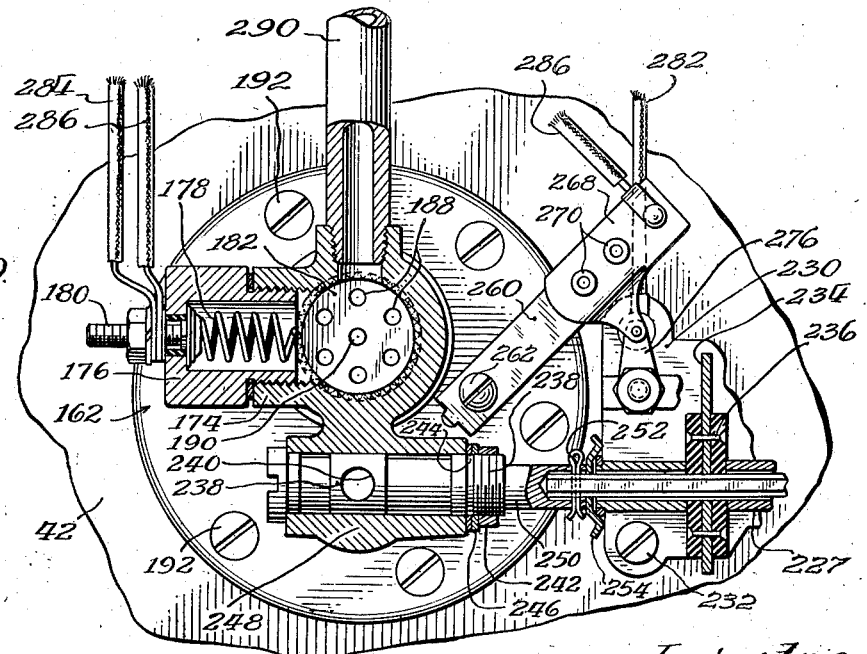

Patented Feb. 20, 1940

2,191,178

UNITED STATES PATENT OFFICE 2,191,178

AUTOMOBILE HEATER

Henry J. De N. McCollum, Chicago, Ill.

Original application January 28, 1936, Serial No. 61,213. Divided and this application January 5, 1940, Serial No. 312,445

21 Claims. (Cl. 237—12.3)

My invention relates generally to automobile heaters, and more particularly to heaters of this type which include an independent heat generator, although a number of features thereof may be utilized in other types of heaters. The various forms of automobile heaters now in use have several inherent disadvantages which are overcome by my present invention. Most, if not all, heaters which derive their heat from the engine of the vehicle—either from the water circulating system or from the exhaust—whether by convection air currents or through steam generation, take a considerable time before they become effective to deliver an appreciable quantity of heat to the passenger compartment of the automobile.

Furthermore, all heaters of these types are limited in the amount of heat which they can deliver by the amount of waste heat generated by the engine, and thus are usually of little value while the engine is idling.

When installing hot water heaters on automobiles equipped with V type engines, it is usually not feasible to connect the heater to both water circulating systems, so that only one-half of the available heating capacity is usable.

In the heater of my invention, a heat generator separate from the engine is utilized, and the capacity of the heater is thus independent of the amount of waste heat which may be available. Furthermore, the heater will commence giving off heat a very short time after it is turned on, long before the engine is sufficiently heated to make possible the use of a hot water heater.

The effectiveness of hot water automobile heaters is further limited by the fact that the temperature of the water circulated through the heater must necessarily be relatively low, especially if anti-freeze solutions which evaporate at a lower temperature than water are employed in the cooling system. In the heater of my invention, the temperature of the radiator may be maintained considerably above that of the boiling point of water, and as a consequence the rate of heat exchange between the radiator and the air circulated past it is much higher than would be possible with any conceivable type of hot water heater. The heat radiator may therefore be made much smaller and more compact.

A further advantage of the heater of my invention is that it need not necessarily be placed near the engine, but may, for example in buses, be located a considerable distance from the engine, where it will have maximum effectiveness in distributing the heat properly to the passenger compartment. In certain installations it may be desirable to have two or more heating units installed upon a single vehicle to procure more uniform distribution of heat in the passenger compartment of a vehicle, and such multiple installations can very readily be made with the heater of my invention.

It is thus an object of my invention to provide an improved heater, particularly for automobiles and the like, which is independent of the engine heat for its operation, which may be easily started, will continue in effective operation without the attention of the operator of the vehicle, and which is relatively simple in construction and may be economically manufactured.

A further object is to provide a liquid fuel burning heater with improved means for maintaining a flame and for reigniting the heater should the flame be accidentally extinguished.

A further object is to provide a liquid fuel burning heater with improved means for igniting the mixture of the fuel and air.

Another object is to provide a heater for automotive vehicles in which liquid fuel is consumed and in which the suction of the intake manifold is utilized to draw the fuel mixture and gases of combustion through the heater.

A further object is to provide an improved automobile heater which is dependable, safe, economical, and effective in use.

Another object is to provide an improved method and means for mounting a heater in automotive vehicles.

Another object is to provide an improved heat exchange device for automobile heaters.

Other objects will appear from the following description, reference being had to the accompanying drawings, in which:

Figure 1 is a central vertical sectional view of the heater, showing also the fuel supply;

Figure 2 is a vertical sectional view taken on the line 2—2 of Fig. 1;

Figure 3 is a plan view of the heater, a portion of the combustion chamber being shown in fragmentary section to show the igniter;

Figure 4 is a fragmentary side elevation of the heater;

Figure 5 is a rear elevation of the heater, portions of the carburetor being shown in section;

Figures 6 and 7 are sectional views taken on the lines 6—6 and 7—7, respectively, of Fig. 5, showing particularly the thermostatic switch;

Figure 8 is an electrical wiring diagram of the heater;

Figure 9 is a vertical sectional view taken on the line 9—9 of Fig. 1; and,

Figure 10 is a fragmentary vertical sectional view taken on the line 10—10 of Fig. 1.

This application is a division of my copending application Serial No. 61,213, filed January 28, 1936, claiming combinations including means for compensating for variations in intake manifold vacuum. Specific forms of means for compensating for variations in intake manifold vacuum are disclosed and claimed in applications Serial Nos. 200,311, 200,312, 200,313, 200,314, and 200,315, all filed on April 6, 1938. The controls and electrical circuits are claimed in my copending applications Serial No. 120,523, filed January 14, 1937, and Serial No. 200,317, filed April 6, 1938.

Brief general description

The automobile heater of my invention comprises generally a simple carburetor which is preferably supplied with gasoline from the float bowl of the usual engine carburetor, there being suitable means to control the flow of gasoline to the heater carburetor and to supply a priming charge of gasoline thereto upon starting. The combustible mixture from the carburetor is fed to a combustion chamber through a suitable preheating device which will cause turbulence of the mixture in the combustion chamber. In a recess in the side of the combustion chamber is located an electrical heating element for igniting the combustible mixture. The outlet end of the combustion chamber is formed by a refractory ceramic plug having a plurality of passageways extending therethrough and having also a small recess for the collection of gases. During normal operation this plug is maintained at sufficiently high temperatures, and it is made of such material and is of such conformation, that it will serve as a reigniter, should the flame in the combustion chamber be extinguished.

The gases of combustion, after passing through the reigniter plug, are drawn through a radiator comprising a circuitous heat-conducting passageway to which heat radiating fins are thermally connected. An electric motor-driven fan circulates air from the passenger compartment of the vehicle over these heat radiating fins. After passing through this heat exchange radiator, the gases of combustion are drawn through a restricted passageway of Venturi tube shape. A suitable conduit connects the outlet end of the Venturi-shaped passageway to the intake manifold of the engine.

The operation of the heater is controlled by a valve in the passageway adjacent the venturi as well as by a switch which controls the supply of current from the battery of the vehicle to the electrically heated igniter and to the fan motor. The combustion chamber has associated therewith a thermostatic switch which is operable to break the circuit to the electrically heated igniter when the combustion chamber attains the temperature of its normal operation. The electric fan motor is in a shunt circuit bridging the thermostatically operated switch so that when the switch is opened the fan will commence blowing air over the radiator. Suitable means are provided to prevent excessive heating of the device and to cause extinguishment of flame should the motor driven fan for any reason cease operation.

The radiator

The radiator comprises a suitably ornamented casing having an integral front 20 and top 22 to which side walls 24 and 26 are secured, preferably by spot welding. The bottom wall 28 has flanges which are welded to the side walls 24 and 26 and has a Z-shaped flange 30 surrounding a large circular opening formed therein. A circular deflector plate 32 rests upon a plurality of resilient projections 34 struck upwardly from the generally horizontal portion of the flange 30, the plate being held in contact with the resilient projections 34 by a retainer ring 36 which is Z-shaped in cross section and is secured within the cylindrical portion of the flange 30 by a press fit. The deflector plate 32 is provided with a plurality of louvres 38 pressed outwardly therefrom, one of the louvres having a handle 40 suitably secured thereto as by welding.

The back plate 42 of the casing is of relatively heavy sheet material and forms a frame for the radiator. This plate 42 fits very closely against the side walls 24, 26 so as to prevent the escape of heated air which might otherwise be directed against the fire wall which separates the engine compartment from the passenger compartment of the automotive vehicle, and upon which the heater is mounted. The side walls 24 and 26 are secured to the back plate 42 by a plurality of cap screws 44 which are threaded in ears 46 bent inwardly from the back plate 42. A pair of arms 48 are bent inwardly from the back plate 42 and form a support for an electric motor 50 which drives a fan 52. A flanged baffle ring 54 is secured to the back plate 42 and surrounds the periphery of the fan 52 to increase the efficiency thereof.

The heat exchanger comprises a closed end tube 56 having a flange 58 formed integrally therewith. Within the cup 56 is a unit forming a long circuitous passageway for the heated gases of combustion, this unit comprising a pair of discs 60, 62, to which are secured channel-shaped plates 64, 66, 68, and 70, and a flat plate 72, each of the plates having riveting lugs projecting through complementary holes formed in the discs 60 and 62. A cushion plate 73 is located between the plate 60 and the end of tubes 56. The plate 62 is provided with an inlet aperture 74 and an outlet aperture 76, and the plates 64, 66, 72, 68, and 70 are provided with suitable openings 78 at successively opposite ends to provide a long circuitous passageway, as indicated by the arrows in Fig. 1.

A plurality of heat radiating fins 82 which are rectangular in shape and extend substantially the full distance between the side walls 24 and 26 of the casing, have central apertures surrounded by flanges 84 and are secured upon the cup 56 by being pressed thereupon. The flanges of the end fins 82 may be prick punched, more firmly to secure them to the cup 56. It will be noted that the flanges 84 serve as a convenient means for accurately spacing the fins. The fins may be made of thin sheet copper or any other suitable material having good thermal conducting and radiating properties.

The radiator mounting

It is important that the casing of the heater which contains the radiator be firmly supported and that the mounting shall be effective harmlessly to distribute any heat which may be conducted from the radiator. I have therefore provided a relatively large mounting plate 86 which has a peripheral L-shaped flange 88 engageable in a complemental aperture formed in the sound and heat insulating portion 90 of the fire wall which separates the engine compartment from the passenger compartment of the vehicle. The mounting plate 86 is secured to the radiator by four studs 92 which are threaded in the back plate 42 and have threaded ends 94 of reduced diameter fitting in holes formed in bosses 96 pressed from the mounting plate 86.

The bosses 96 form recesses for the reception of nuts 98 threaded on the reduced diameter portions 94 of the studs 92. The mounting plate 86 has a plurality of nuts 100 which are crimped upon suitable bosses, the nuts 100 receiving cap screws 102 which extend through the metallic fire wall 103 of the vehicle, suitable lock washers being provided on these bolts.

Fuel supply

For convenience and dependability, I preferably use gasoline as the fuel to be burned in the heater of my invention. The float bowl of the engine carburetor forms a convenient source of supply for the gasoline. In Figs. 1 and 2 the float bowl 104 of the engine carburetor is shown as tapped to receive a street L 106, a screen 108 being provided to prevent solid matter from being drained from the float bowl with the gasoline. A fitting 110 is threaded in the street L, this fitting having a fine mesh screen 112 secured therein by a retaining ring 114. A T fitting 116 is threaded in the outlet end of fitting 110 and has a flow restriction plug 118 pressed therein. This plug is provided with a very small opening 120, preferably in the order of .010" in diameter.

A priming well 122 is secured to one branch of the T fitting 116 by an elbow 119, the top of the well 122 being covered by a closure 124. This closure has a plurality of ribs 126 pressed outwardly therefrom so that when the the closure is pressed into the end of the well 122 there will be a clearance of approximately .010" between all parts of the closure and the walls and end of the well, except of course at the points at which the ribs 126 contact with the well, and the interior of the well will thus be vented to the atmosphere. Extending upwardly from the bottom of the well is a tube 128 which has a hole 130 drilled through the side thereof above the bottom of the well, this hole being in the order of .015" in diameter. The portion of the T fitting 116 to which the elbow 119 is connected has a restricted opening 132 formed therein communicating with the passage through the T, this opening being preferably considerably larger than the hole 130 in the tube 128, preferably in the order of .035" in diameter. The fuel is supplied to the heater carburetor through a tube 134 which is suitably secured to the other branch of the T fitting 116.

The heater carburetor

The heater carburetor is preferably located at a level a few inches above the float chamber of the engine carburetor and has a fuel receiving elbow fitting 136 which is connected to the fuel supply tube 134. The elbow 136 is threaded into a fitting 138 having a vertically drilled diametral hole 140 to receive a Venturi tube 142. The Venturi tube is pressed into the fitting 138 and held in place by a pin 143. The inlet of the Venturi tube is formed by a suitably shaped Venturi mouth 144 which is pressed into position in a bore formed at the upper end of the tube 142. A fine mesh screen 146 is secured to the upper end of the Venturi tube by means of a flanged ferrule 148. Suitable orifices 150 are provided to conduct gasoline from the elbow 136 to a point adjacent the throat of the Venturi tube 142. A plurality of holes 152 are drilled at the lower end of the Venturi tube to admit additional air, to form a mixture of correct proportions. A shield 154 is secured around the venturi 142 by a nut 156 to protect the carburetor parts and to make necessary that the air entering the carburetor through the screen 146 follow an upward path. The lower end of the Venturi tube 142 is threaded in a bushing 158 which is in turn threaded into an extension 160 forming part of the body 162.

The combustion chamber and igniter

The combustible mixture of gasoline and air which is supplied by the carburetor is fed through a tube 164 which is pressed into a passageway 166 formed in the extension 160. A baffle plate 168 of suitable heat resisting material is located in the combustion chamber 172 adjacent the open end of the tube 164. The baffle plate is supported on three radially extending ears engaging the walls of the chamber 172, and has a diameter about ⅛" less than the combustion chamber. The tube 164 projects into the combustion chamber 172 formed in the body 162. The mixture of gasoline and air is distributed fairly evenly throughout the chamber because of the turbulence engendered by impact with the baffle plate. During operation, this tube and baffle plate become hot and pre-heat the fuel and gas mixture.

At the side of the combusion chamber (Figs. 5 and 9) is a boss 174 into which an igniter body 176 is threaded. This igniter body has a longitudinally extending bore in which a resistance element 178, which constitutes the igniter, is mounted. The inner end of the resistance element, which may be made of nichrome wire, is preferably welded or otherwise secured to the inner end of the igniter body, while the outer end of the resistance wire is suitably insulated from the body 176 and is electrically connected to a binding post 180, which is likewise insulated from the body of the igniter by heat resistant insulating bushings and washers. It is important that the igniter be located in a pocket of the combustion chamber where it is not exposed directly to cooling by the incoming mixture of air and gasoline.

A reigniter plug 182 is held in a suitable socket 184 formed in the end of the combustion chamber 172 by a retaining ring 186. The cylindrical surface of this reigniter plug is preferably striated so as to reduce the area of contact between the plug and the body 162, thus lessening the rate of transmission of heat from the plug to the body.

The reigniter plug is preferably made of a refractory ceramic material which is slightly porous. The plug is provided with a plurality of longitudinally extending passageways 188 which are of relatively small diameter and is also provided with a recess 190 at its center and opening into the combustion chamber.

The reigniter plug 182 will, during the operation of the heater, normally remain at a sufficiently high temperature to reignite the combustible mixture, should the flame be accidentally extinguished. Furthermore, this reigniter plug aids in obtaining complete combustion by providing a hot spot in the combustion chamber. It is believed that the reigniting plug is effective in reigniting the mixture after the flame has been extinguished because of the fact that the combustible mixture tends to collect in the recess 190 and stays in this recess a sufficiently long time to become heated to a temperature necessary to cause its ignition.

Considerable difficulty was had in the provision of the reigniter plug, since this element must satisfy a great many requirements. It must be composed of material which will not deteriorate when maintained at high temperatures for long periods of time, and it must be sufficiently homogeneous and strong that it will not flake or crack when exposed to rather sudden temperature changes of considerable magnitude. Furthermore, the material should be slightly porous, since it appears that reignition of the combustible mixture commences in the minute depressions and crevices formed in the surface of the plug, it having been found that a plug having a glazed or smooth vitreous surface is not nearly as effective to reignite the combustible mixture as a plug of a material which has a slightly porous surface. Furthermore, the reigniter plug should not be a very good conductor of heat, since the plug must be effective to hold heat for an appreciable length of time to permit reignition to take place. For example, it has been found that a reigniter plug made of metal conducts heat to the body of the combustion chamber much too rapidly to serve very efficiently as a reigniter.

The recess 190 in the center of the plug must be small enough and deep enough to prevent excessive turbulence of the gas, yet it must be large enough to permit the entrance of the combustible mixture of air and gasoline. I have found that a recess in the order of ⅛″ in diameter and ¼″ deep is satisfactory, although it will be understood that there may be appreciable variation in the size, shape, and location of this recess without rendering the reigniter ineffective. However, with a plug of the above described properties and a recess of the given dimensions, it has been found that the reigniter will be effective after the flame has been out for a period of at least fifteen seconds.

The body 162 is secured to the back plate 42 by a plurality of cap screws 192. A suitable gasket 194 (preferably made of copper and asbestos) is interposed between the body and the flange 58 of the radiator cup 56. The body 162 is preferably provided with a recess 196 to receive the gasket 194. A seal is effected between the disc 62 and the body 162 by a thin gasket 198 which is interposed between these parts and which has suitable apertures in registry with the openings 74 and 76 formed in the disc 62.

*The compensator for variations in intake manifold vacuum*

As is well known, the degree of vacuum in the intake manifold of an internal combustion engine used upon an automobile may vary considerably during normal operation, ranging from zero to approximately 26″ of mercury. As previously stated, the vacuum present in the intake manifold of the engine is utilized to draw the air and gasoline into and through the heater carburetor to the combustion chamber and to draw the products of combustion through the radiator. If the degree of vacuum in the combustion chamber were permitted to vary as greatly as does the vacuum in the intake manifold of the engine, the operation of the heater would be very irregular and unsatisfactory. The probability is that the flame in the combustion chamber would be extinguished frequently due to these variations in the vacuum.

I have, therefore, provided a suitable means for compensating in a great measure for the variations in intake manifold vacuum. This means comprises a restriction nozzle or tube 200 which is secured in the reduced end of a compensator chamber 202 formed in an extension 204 of the body casting 162. The nozzle 200 has a Venturi-shaped passageway extending therethrough and at its inlet end is normally in communication with a passageway 206, the latter being in registry with the outlet opening 76 in the disc 62 of the radiator. A tube 208 is secured to the end of the extension 204 by a suitable compression coupling and has its other end similarly secured to the intake manifold 210 of the engine.

Since the pressure in the passageway 206 can never be greater than atmospheric pressure, and the dimensions of the passageway through the restriction nozzle 200 are such that with approximately a 4″ vacuum in the intake manifold, the vacuum at the throat of the Venturi passageway in the nozzle 200 will be of a maximum value, i. e., the pressure at the throat will approach zero absolute. Thus, any increase in the vacuum in the intake manifold (decrease in absolute pressure) cannot result in an appreciably decreased pressure at the throat of the tube, and as a result, the rate of flow through the tube 200 will be substantially constant whenever the vacuum in the intake manifold is equivalent to or exceeds approximately 4″ of mercury.

Even if the vacuum in the intake manifold drops below the 4″ of mercury (which was assumed to be approximately the vacuum necessary to cause the maximum vacuum at the throat of the tube 200), the decrease in the rate of flow through the tube 200 will not be very great. Since large decreases in the intake manifold vacuum take place only occasionally upon sudden acceleration of the vehicle, and are usually of short duration, such decreases usually do not result in the extinguishment of the flame, or, if the flame in the combustion chamber is extinguished, it is promptly reignited by the reigniter plug as soon as the vacuum is again normal.

Another advantage of the compensator is that a greater weight of gas will flow through it when the gas is cold than when the gas is heated. Thus, in starting the heater, a greater weight of gas will be drawn through the heater than when the heater has been in operation for some time, thereby aiding in bringing the heater more rapidly to its fully effective operating temperature.

*Control means*

The heater is controlled by a handle 212 having a stem 214 guided in a rubber grommet 216 mounted in an angle clip 218 which is preferably welded to the side wall 24 of the radiator housing. The lower end of the stem 214 has a sidewardly bent extremity passing through a grommet 220 carried by a lever 222, the end of the stem being held in the grommet by a cotter pin 224. The lever 222 is secured to the end of a square shaft 226 which is mounted for rotation in bearings 227 which are supported by a U-shaped bracket 228, the bracket being held in place by an insulating switch plate 230 which is secured to the back plate 42 by screws 232. A knife switch blade 234 is embedded in a disc 236 made of hard rubber or other suitable insulating material, the switch blade being thus insulated from the shaft 226 which extends through a square hole formed in the insulating disc 236. The disc 236 is centered between the two upstanding portions of the bracket 228 by the bearing members 227.

A rotating plug valve 238 has a passageway 240 (Fig. 1) adapted to register with the passageway 206 and is secured in position by a nut 242 threaded on the stem of the plug 238, a flat washer 244, and a lock washer 246 being interposed between the nut 242 and the end face of a boss 248 (which is formed integrally with the body 162) to maintain the valve tight. An extending stem 250 of the valve 238 has a socket to receive the end of the square shaft 226, and the shaft and stem are non-rotatably secured together by a cotter pin 252. A spring washer 254 is interposed between the end of the stem 250 and the bracket portion 228, so that the former will be frictionally held in any position to which it may be moved.

The blade 234 of the knife switch is cooperable with a pair of resilient contact strips 256 and 258, which are bolted to the insulating switch plate 230.

A bimetallic thermostatic element 260 has one end secured to the body 162 by a screw 262, the end of the thermostatic element having a depending tongue 264 engaged in a recess 266 formed in the body casting 162 properly to position the element. A contact bracket 268 is secured to the thermostatic element 260, as indicated in Figs. 6 and 7, by a pair of hollow rivets 270, suitable insulating material being interposed between the bracket and the thermostatic element. A contact point 272 is carried by the bracket 268 for cooperation with a complemental contact point 274 carried by a lug 276, which is secured in conductive relationship with the switch contact 258 by means of the bolt by which the contact 268 is secured to the insulating switch block 230. The thermostatic element 260 when at or near atmospheric temperature will maintain the contact point 272, 274 closed, but when the temperature of the body casting 162 attains a value which is near the normal when the heater is operating satisfactorily, the thermostatic element 260 will separate the contact points 272, 274.

The wiring diagram shown in Fig. 8 clearly indicates the electrical connections to the heater. Current is supplied by the usual storage battery 278, one side of which is grounded. If desired, the current for the heater may be connected in series with the ignition switch 280 of the automobile, although the knife switch contact 256 may, if desired, be connected directly to the battery. Current to the heater is controlled by the knife switch 234, 256, 258, which, upon being closed, supplies the motor 50 with current through conductors 282 and 284. It will be noted that the circuit to the motor is shunted by a circuit including the lug 276, contact points 272, 274, and conductor 286, and that these two parallel circuits are connected in series with the resistance heating element 178 which forms the igniter. This particular circuit arrangement is not my invention, but is fully disclosed and claimed in the patent to Arden W. Le Fevre, No. 2,133,103, dated October 11, 1938.

From the wiring diagram of Fig. 8, it will be apparent that when the heater is cold and the contacts 72, 74 are closed, these contacts will short circuit the windings of the motor so that substantially all of the current from the battery will flow through these thermostat contacts. The fan motor will, therefore, not operate upon initial closure of the knife switch, and thus the uncomfortableness of having the fan motor cause a blast of cold air to be directed at the occupants of the vehicle, is obviated. When, however, the heater has operated a sufficient length of time that its body 162 is at a sufficiently high temperature to cause deflection of the thermostatic element 260, the contact points 272, 274 will be separated and the motor 50 will then be supplied with current. As a result, the fan motor commences operation only after the radiator is sufficiently warm to heat the air circulated by the fan. It will be noted that the current used to operate the motor must flow through the igniter 178, but since the resistance of the igniter is very low compared with the resistance of the windings of the motor, the igniter will not be heated appreciably by the current passing through it, and will not add to the load upon the battery.

*Safety valve*

In order to prevent the possibility of overheating, I have provided a safety valve which is thermostatically controlled and is operable to admit a large volume of atmospheric air to the combustion chamber to cool the latter and to extinguish the flame therein. Such overheating might result should the electric motor driven fan cease operation for any reason.

The safety valve is mounted at the end of a bent pipe 290, which is in communication with the combustion chamber 172, being threaded in the body casting 162. A bushing 292 is threaded to the outer end of the pipe 290 and has a U-shaped bimetal thermostatic element 294 secured thereto by a nut 296. A valve 298 is carried by the free end of the bimetal strip 294, and has a generally conically shaped portion 300 which is adapted to contact with a seat 302 formed at the end of the bushing 292.

At normal temperatures the bimetal element 294 is biased so as resiliently to hold the valve 298 firmly against the seat 302. The bimetal element is located within the radiator casing above the fan and radiator. With the fan operating normally, the bimetal element 294 will be in the path of cool air drawn into the casing by the fan. If, however, the fan motor should burn out or for any other reason the fan should be ineffective to circulate air past the radiator, the heated air from the radiator would promptly rise and flow past the bimetal element 294, thus causing deflection of the latter in a direction to relieve the tension holding the valve 298 to its seat and withdrawing the valve from its seat.

When the valve 298 is open, atmospheric air is drawn directly into the combustion chamber, and since this is a low resistance path of flow for the air, the vacuum on the carburetor will be insufficient to permit effective operation thereof. Thus, if the valve is raised an appreciable distance from its seat, the flame in the combustion chamber will be extinguished due to the large supply of incoming cold air and to the decrease in the supply of fuel mixture from the carburetor.

*Operation*

The operations performed by the various elements of the heater have been described in some detail in connection with the detailed description of the parts. I shall therefore merely describe in general the operation of the heater as a whole, and point out the various advantages of the constructions and methods of operation employed.

When it is desired to use the heater, the operator will push the handle 212 inwardly and downwardly, thereby rotating the square shaft 226 to open the valve 238 in the outlet passageway 206 and close the knife switch 234, 256, 258. As soon as the valve 238 is opened, the suction of the intake manifold will reduce the pressure in the combustion chamber and in the passageways of the carburetor 142, whereupon a partial vacuum will also be induced in the conduit tube 134 which, through the restricted passageway 132, is in communication with the well 122. This partial vacuum will thus draw gasoline from the well 122 through the tube 128, restricted orifice 132, T fitting 116, and tube 134 to supply the carburetor with a priming charge of gasoline which will result in a very rich mixture being drawn into the combustion chamber 172. During this interval, the igniter 178 will have become heated to incandescence and will ignite the rich priming mixture being fed to the combustion chamber.

After the level of the fuel in the well 122 reaches the top of the tube 128, the amount of fuel fed to the carburetor will be greatly decreased but a charge of fuel still slightly in excess of the normal will be supplied through the port 130 drilled in the side of the tube 128. Thus, during the time that the combustion chamber is being heated to its normal operating temperature, a mixture of fuel and air slightly richer than normal will be continued to be supplied.

At about the time that combustion becomes normal, the fuel in the priming well 122 will have become exhausted and air will be drawn in through the tube 128 and gasoline will flow directly from the float bowl of the engine carburetor past the screens 108 and 112 through the orifice 120 in the plug 118, and thence through the tube 134 to the carburetor. The air drawn through the tube 134 with the gasoline thus drawn from the float bowl of the carburetor will decrease the specific gravity of the mixture so that it may be easily elevated to the carburetor.

As soon as the body casting 162 becomes sufficiently heated as a result of normal combustion, the thermostat controlled contacts 272, 274 will be separated and the fan motor thus supplied with current, causing the circulation of air between the fins 82 and around the radiator shell or cup 56 into the passenger compartment of the vehicle.

Upon pulling upon the handle 212, the main switch 234, 256, 258 will be opened and the valve 238 closed, whereupon the heater will immediately cease operating.

Theory of operation

There are a number of factors relative to the construction and design of the heater which are of considerable importance in their contribution to continuous, efficient, and substantially noiseless operation. Combustion of a mixture of fuel and air in an enclosed space presents difficulties which are not encountered in devices in which combustion takes place in a relatively open space, as for example, in a blow torch. The fact that the heater is usually operated only when the atmospheric temperature is very low is a factor which must be taken into consideration in the design of the heater. The matter of variation in the intake manifold vacuum is likewise a factor which tends to differentiate the problem of maintaining continuous combustion in the heater from that encountered in other burners wherein the flame is projected into a relatively large air space.

As has been previously pointed out, the starting of the heater is facilitated by virtue of the fact that the mixture is made relatively rich during the starting period. The mixture is richer because, during starting, gasoline is supplied to the carbureting device 142 at a more rapid rate than is required for continued operation.

Since the carbureting device is above the level of the gasoline in the fuel reservoir, there is no danger of the fuel syphoning from the fuel reservoir through the carbureting device into the heater. Furthermore, the carbureting device is located a sufficient distance from the combustion chamber and from the heat exchange device that it will remain at a relatively low temperature. It will be understood that in jet type carburetors of the kind disclosed herein the mixing efficiency falls off rapidly as the carburetor is heated to a temperature approaching the boiling point of the main constituents of the fuel. By virtue of the fact that the carbureting device is spaced an appreciable distance from the combustion chamber and from the heat exchanger, and away from the path of flow of the heated air, the carbureting device may be maintained at a reasonably low temperature and thus operate efficiently to provide a proper mixture of fuel and air.

The holes 152 formed in the nozzle portion of the carbureting device are effective in producing the desired fuel to air ratio, without making it necessary to draw all of the air through the Venturi passageway of the nozzle. The turbulence produced by air entering these auxiliary air inlets aids in breaking up the particles or globules of gasoline into smaller particles so that the mixture supplied to the tube 164 is partially atomized.

It will be noted that the inlet end of the combustion chamber is conical in shape so that the mixture flowing into the combustion chamber through the tube 164 is permitted to reduce its speed of flow. This is of importance since, if the flow through the tube 164 were not maintained at a rate above that of the flame propagation rate (under the given conditions), the flame might flash back through the tube 164 to the carbureting device, thus resulting in inefficient operation due to the heating of the carbureting device. Under certain circumstances, such flashing back of the flame to the carbureting device might constitute a dangerous fire hazard.

The mixture of fuel and air is projected against the baffle 168 which serves to break up any unatomized particles of gasoline, to assure easier starting and more efficient combustion. The baffle 168 is kept cooler than the other parts of the combustion chamber by the incoming mixture so that it does not crack the gasoline and have coke deposits formed thereon. The baffle also keeps the mixture from impinging directly upon the reigniter plug 182. Without the presence of the baffle, the impingement of the cool mixture against the reigniter plug might tend to cool it during such intervals as the heater is accidentally extinguished due to failure of a sufficiently high vacuum in the intake manifold, and as a result, the reigniter would become much less efficient as a means to reignite the combustible mixture after such interruption.

The flow through the ports surrounding the baffle 168 is in substantially the form of a hollow cylinder and at a sufficiently rapid rate to make certain that under normal operating conditions there will be no flash-back past the baffle.

The location of the igniter is of considerable importance since it must be effective under a wide variety of operating conditions, to assure ignition of the combustible mixture flowing into the combustion chamber.

As shown in Figs. 3 and 9, the igniter 178 is located in a shell 176 having a thin wall skirt portion threaded into a boss formed at the side of the combustion chamber casting. The inner end of the resistance wire igniter 178 is welded or brazed to this thin wall skirt portion of the igniter shell and has its other end welded or brazed to the end of a stud which is insulated from the igniter shell by insulating washers and a square insulating bushing, so that after the igniter wire is secured at its inner end to the shell, the nut may be threaded on the stud 180 without danger of rotating the latter, and hence without danger of twisting the igniter wire 178 out of shape.

Since the igniter 178 is not in the direct path of flow of the combustible mixture entering the combustion chamber, it will be more effective to ignite the mixture. The automobile battery voltage available for operation of the electrical igniter may vary from five and one-half volts or less to eight and one-half or nine volts. The igniter must operate efficiently at either of these voltages. The requirements of its size, resistance, and arrangement are therefore relatively severe. It must be capable of being raised to a temperature at which it will ignite the mixture when it is subjected to the low voltage of approximately five and one-half volts, but at the same time it must not be raised to an excessively high temperature when the current supplied for its energization is at a potential of eight and one-half or nine volts. These requirements are adequately met in the construction disclosed herein since even though the igniter be operated at the low voltage, the heat generated therein is confined to a relatively small space, and the space in which the igniter is located is out of the direct path of flow of the combustible mixture through the chamber. As a result, after a short time, the igniter wire will become sufficiently hot to ignite the mixture even though the voltage applied to it is considerably less than the normal voltage. The fact that the inner end of the igniter wire is brazed to the inner end of the shell where the latter is of relatively thin wall section, facilitates heating of this portion of the shell, by conduction and radiation from the resistance wire, so that incoming gasoline and air mixture which tends to stagnate in this portion of the shell is more readily vaporized and ignited by the electrical igniter. Because the igniter is located at the side of the combustion chamber, some of the mixture may collect in the shell, where it may be acted upon by the radiant heat from the igniter and its shell and thus raised to its kindling temperature. If the igniter were located in the path of the mixture of gasoline and air, an enormous amount of electrical energy would be required to raise it to a temperature at which it would kindle the mixture. It would be very impractical to endeavor to supply a sufficient amount of electrical energy to the igniter under these conditions, because soon after the combustion commenced, the igniter would no longer be cooled appreciably by the incoming mixture and would thus be raised to a very high temperature at which it would oxidize and erode very rapidly.

The coils of the igniter wire must not be spaced too closely together, otherwise the central coils will become overheated due to the radiation of heat from the adjacent coils. The end coils conduct and radiate heat to the igniter shell more rapidly than do the central turns of this wire.

The size of the combustion chamber relative to the inlet and outlet passageways is somewhat critical in that if the chamber is made too small, the ratio of wall surface to volume would be so great that combustion could not readily be maintained. On the other hand, if the combustion chamber is made relatively large, initial ignition is difficult and continued smooth burning impossible because of the following factors: Upon ignition, a miniature explosion takes place in the combustion chamber. If the volume of the combustion chamber is too large, the gases of combustion will be projected past the baffle 168 into the inlet end portion of the combustion chamber and possibly also through the induction tube 164, as well as being projected through the openings in the reigniter plug 182. Immediately following this initial explosion, the gases of combustion would be drawn from the space beyond the baffle 168 and from the induction tube, but such incombustible gases would cause extinguishment of the flame. Thereafter, upon a fresh supply of the combustible mixture being drawn into the combustion chamber, another explosion would take place. After a time, these explosions would take place at regular intervals, with the result that the heater would make an undesirable noise. These cyclic explosions would likewise result in inefficient combustion and possibly make it necessary that the igniter be energized continuously.

Stated differently, the volume of the combustion space should bear such relationship to the rate at which the combustible mixture is drawn into it that the miniature explosion resulting from initial ignition of the mixture has not had time to become extinguished before an additional supply of the combustible mixture enters the combustion space past the baffle 168. If the products of combustion of such initial explosion are still of a sufficiently high temperature to ignite the mixture entering the combustion space following such initial explosion, continuous combustion will take place. Another limiting condition pertains to the rate of flow of the mixture through the combustion chamber. If this flow is too rapid or closely approaches the rate at which the flame can propagate itself through the mixture, the flame will be virtually blown from the combustion chamber by the incoming mixture.

The length of the combustion chamber is also of importance in that the hottest portion of the flame should impinge upon the reigniter plug so as to raise the latter to the maximum temperature. The effectiveness of the plug 182 as a reigniter depends upon its ability to remain at a temperature above the kindling point of the mixture for a considerable period of time, and it will be apparent that it is therefore desirable to heat it to the highest possible temperature.

Since the outlet of the combustion chamber is formed by the relatively small diameter passageways 188 extending through the reigniter plug 182, there is but a slight possibility that the flame will be carried through these passageways during starting. The ratio of the wall surface to cross sectional area is so great that when the reigniter plug is cold, the burning mixture entering these passageways will be extinguished due to the rapid cooling effected by the reigniter plug. If, during starting, the flame were permitted to pass freely into the heat exchange device, the mixture of gasoline and air therein might explode and thus drive gases of combustion backwardly past the baffle plate 168, with the result that the flame would be extinguished as previously described. For this reason, as well as to obtain greater efficiency of heat transfer, the tortuous passageway for the gases of combustion through the heat exchange device is of sufficiently small cross sectional area relative to the wall surface that cooling takes place very rapidly, and as a result, the flame cannot be sustained in this tortuous passageway when the walls of the latter are cold. After the heater has commenced normal operation, the reigniter plug will ordinarily become sufficiently hot that the flame may pass through the passageways 188 therein without being extinguished. However, under these circumstances, the tortuous passageway through the heat exchanger will be filled with spent gases of combustion so that there will be no danger of an explosion in the latter passageway.

Another factor pertaining to the theoretical principles of operation of the heater of my invention resides in the unusual condition, as compared with other burners, that combustion takes place under sub-atmospheric pressure. This factor greatly increases the problem of ignition, making it rather difficult to ignite the mixture by means of a spark plug ignition system. I have found that ignition may be accomplished reliably by means of the high resistance wire igniter, principally because the latter produces sufficient heat to vaporize the gasoline in the mixture closely adjacent the igniter, and thereby render the mixture more easily ignitible. In addition, the use of a resistance wire igniter eliminates the necessity of providing a spark coil and associated electrical apparatus, or the necessity of possibly interfering with the operation of the engine if the ignition system of the latter is utilized as a source of high tension current for the spark plug.

It will be noted that the thermostatic switch 272, 274, which controls the circuit to the igniter, is located out of the path of flow of air from the fan 52, and derives the heat for its operation directly from the combustion chamber casting. If this thermostatic switch were located in the path of air flow caused by the fan, a hunting action might take place because as soon as the thermostatic switch opens, the fan motor is energized, and such energization would cause the flow of cooling air over the thermostat and such cooling might cause the thermostatic switch to reclose. By having the thermostatic switch unaffected by the air circulation caused by the fan motor, its action is stable.

Further, it will be noted that the stationary blades 256, 258 and the movable blade 234 of the main manually operated switch are sufficiently long that the control button 212 may be moved to a considerable distance without opening the main switch. Thus, after the heater has commenced operating, the control button 212 may be moved partially to close the valve 238 without cutting off the current supply to the heater. This is a convenient arrangement when the heater is being used in moderately cold weather and it is not desired to utilize the full heating capacity of the heater.

Although I have described the invention in detail, it will be understood that I do not limit myself to the construction shown, since various modifications thereof may be made without departing from the underlying principles of the invention.

I claim:

1. In an automotive vehicle having a passenger compartment and an engine compartment separated by a wall, an internal combustion engine having an intake manifold located in the engine compartment, a fuel reservoir, a heat radiator located within said passenger compartment, means for circulating air from said passenger compartment past said radiator, a connection from said radiator to the intake manifold of said engine, a control valve in said connection, a heater carburetor located at a level above said fuel reservoir and supplied with fuel therefrom, a combustion chamber supplied with a mixture of air and fuel by said carburetor and connected to said radiator to supply heated gases thereto, electrical means for igniting the mixture in said combustion chamber, and a wall of slightly porous refractory material at one end of said combustion chamber in position to be heated by the gases of combustion in their course of flow to said radiator, said wall having apertures extending therethrough for the discharge of the gases of combustion from said chamber and having a recess formed therein, said wall being adapted to be heated to a high temperature and to reignite the mixture in said combustion chamber should the flame therein become extinguished due to temporary failure of a sufficient supply of combustible mixture to said combustion chamber.

2. In a heater for an automobile having a passenger compartment and an engine compartment separated by a wall, an internal combustion engine having an intake manifold in which the degree of vacuum varies with variations in speed and power output of the engine, said heater comprising a radiator located within the passenger compartment of the vehicle, mounted adjacent said wall and having a passageway extending therethrough, a motor driven fan for circulating air from the passenger compartment of the vehicle downwardly past said radiator, a casing for said radiator, fan, and motor, means for supporting said casing from said wall, a combustion chamber secured to said radiator and casing and having a portion extending through said wall, a carburetor located within the engine compartment and secured to said portion of said combustion chamber, means for supplying the liquid fuel to said carburetor, and valve controlled means for connecting said radiator to the intake manifold of the engine, thereby to draw air and liquid fuel through said carburetor, into said combustion chamber, and to draw the products of combustion from said chamber through said radiator into said intake manifold.

3. In a heating system for automotive vehicles having the passenger compartment and the engine compartment separated by a wall, an internal combustion engine in the engine compartment having an intake manifold, a heater of the internal combustion type having a body provided with a combustion chamber, a carburetor located in the engine compartment of the vehicle and connected to supply a combustible mixture to said combustion chamber, a heat radiator located within the passenger compartment of the vehicle and connected to receive the products of combustion from said chamber and deliver the heat thereof to the passenger compartment of the vehicle, means for mounting said heat radiator at a spaced distance from said wall, and means extending through said wall for conducting the products of combustion from said heat radiator to the intake manifold of the engine.

4. In a heater for the passenger compartment of an automotive vehicle, the combination of a source of liquid fuel, a device for mixing air with fuel derived from said source, a combustion chamber, means including an apertured heat retaining member for conducting mixed fuel and air from said device to said combustion chamber, an igniter located in said combustion chamber, a heat radiator secured to but separable from said combustion chamber, means for circulating air from the passenger compartment past said radiator, means conducting the gases of combustion from said combustion chamber into said radiator, and means for producing a partial vacuum connected to cause flow of said gases of combustion from said chamber through said heat radiator.

5. In a unit heater for an automobile having an internal combustion engine and a passenger compartment, the combination of a heat exchange device, means for securing said device in said passenger compartment, a combustion chamber separate from but communicating with said heat exchange device to supply heated gases of combustion thereto, an apertured heat retaining means forming the means of communication between said combustion chamber and said heat exchange device, and means connected to the intake manifold of said internal combustion engine to produce a partial vacuum in said heat exchange device and thereby draw said gases of combustion through said device into the intake manifold.

6. In a heater for an automotive vehicle driven by an internal combustion engine located in an engine compartment, the combination of a source of liquid fuel, a carbureting device located in the engine compartment of the vehicle for mixing air with fuel derived from said source, a combustion chamber, means for conducting mixed fuel and air to said combustion chamber, an igniter located in said combustion chamber, a heat exchanger separate from said combustion chamber, means to conduct the gases of combustion from said combustion chamber through said heat exchanger, and means for connecting said heat exchanger to the intake manifold of the engine thereby to draw said gases of combustion through said heat exchanger into the intake manifold.

7. In a heater, the combination of a source of fuel, a relatively small combustion chamber having an inlet for receiving a mixture of air and fuel from said source, and having an outlet, a resistance wire igniter located at the side of and out of the direct path of flow of fuel from the inlet to the outlet of said combustion chamber, means to connect said igniter to a source of electricity, and an apertured ceramic reigniter plug having a recess therein facing toward the combustion chamber, said plug partially obstructing the outlet of said combustion chamber.

8. In a heater, the combination of a source of fuel, a combustion chamber receiving fuel from said source, an electrically operated resistance wire igniter in said combustion chamber at the side of and out of the direct path of flow of fuel from said source, and a reigniter comprising a ceramic wall of said combustion chamber having perforations therein for the passage of gases therethrough, and having a pocket formed therein in a position to receive fuel from said combustion chamber.

9. In a heater of the internal combustion type in which combustion takes place in an enclosed space under subatmospheric pressure, the combination of a heat radiator having a tortuous passageway extending therethrough and having an inlet and an outlet, a space at subatmospheric pressure connected to the outlet of said radiator, a combustion chamber casting connected to said radiator and having a generally cylindrical combustion chamber formed therein in communication with the inlet of said radiator, an apertured ceramic reigniter plug partially obstructing communication between said combustion chamber and the inlet of said radiator, means for supplying a combustible mixture of fuel and air, a conduit connecting said means with said combustion chamber, said conduit having a cross sectional area appreciably less than that of said combustion chamber, an apertured baffle member located between the end of said conduit and said combustion chamber, the total cross sectional area of the apertures in said baffle being substantially less than the cross sectional area of said combustion chamber, an electrically heated resistance wire located in communication with said combustion chamber but out of the direct path of flow of the fuel mixture therethrough, a source of electrical energy, and means for connecting said igniter to said source.

10. In an automobile heater of the internal combustion type, the combination of a casting having a generally cylindrical combustion chamber formed therein, means for supplying a combustible mixture of fuel and air thereto, an igniter shell secured to said casting and having its interior in communication with said combustion chamber, an electrically heated resistance wire secured in said shell and having one end thereof electrically connected thereto, means to supply electrical energy to said igniter for heating the latter to a temperature of incandescence, and means for creating a partial vacuum in said combustion chamber, thereby to draw the mixture of fuel and air into said chamber and to withdraw the products of combustion therefrom.

11. In an automobile heater of the internal combustion type, the combination of a heat exchange device having an inlet and an outlet and a circuitous passageway connecting said inlet and said outlet, means for circulating air from the passenger compartment of the automobile over said heat exchange device, a combustion chamber casting having a combustion chamber formed therein, means for supplying a combustible mixture of fuel and air to said combustion chamber, and means for conveying the gases of combustion from said combustion chamber through said circuitous passageway in said heat exchange device, a resistance wire igniter located in a space communicating with said combustion chamber but out of the path of flow of the mixture of fuel and air therethrough, a source of electrical energy, a thermostatically operated switch for controlling the connection of said source to said igniter, and means for securing said thermostatically operated switch in heat conducting relationship with respect to said combustion chamber casting and displaced from the path of the flow of air past said radiator.

12. In a heater of the internal combustion type for heating the passenger compartments of automotive vehicles, the combination of a fuel supply, a fuel and air mixing device, a combustion chamber, a tortuous conduit forming part of a heat exchanger, a space normally maintained at subatmospheric pressure, means connecting said carbureting device, said combustion chamber, said tortuous conduit, and said space at subatmospheric pressure in series so as to cause flow of air into said carbureting device under atmospheric pressure, and hence through said combustion chamber, said tortuous passageway, into said space, a manually operated valve in said connecting means for controlling such flow, an electrical resistance wire igniter associated with said combustion chamber and communicating therewith, a source of electrical energy, a circuit between said igniter and said source, and thermostatic switch means responsive to the temperature of said combustion chamber casting to open said circuit when the temperature of said combustion chamber casting exceeds a predetermined maximum value.

13. In a heater of the internal combustion type, the combination of a combustion chamber casting having a boss formed thereon and having a generally cylindrical combustion chamber formed therein, means to supply a combustible mixture to said combustion chamber and to withdraw products of combustion therefrom, means to ignite the combustible mixture in said combustion chamber, said last named means comprising an igniter shell secured in said boss and having a thin wall skirt portion extending toward said combustion chamber, a coiled electrical resistance wire having one end secured to said skirt portion, a stud secured to the other end of said wire, means for non-rotatably securing said stud in said shell with a portion projecting therefrom, said means including parts insulating said stud from said shell, and means for supplying electrical energy to said wire for heating the latter to a temperature at which it is incandescent.

14. In a heater for automobiles having an internal combustion engine, a passenger compartment to be heated, and a liquid fuel supply system, the combination of a carbureting device connected to said fuel supply system to receive liquid fuel therefrom, a combustion chamber casting having a combustion chamber formed therein and having a relatively long tubular extension communicating with said combustion chamber and forming the means for supporting said carbureting device, said extension being sufficiently long to prevent the temperature of said carbureting device from being raised appreciably by heat derived from said combustion chamber casting, means for causing flow of a combustible mixture from said carbureting device to said combustion chamber, and means associated with said combustion chamber for igniting the combustible mixture therein.

15. A combustion apparatus for internal combustion type heaters, comprising a casting having a combustion chamber formed therein, a baffle across the inlet end of said chamber said baffle being imperforate throughout its central portion and providing a plurality of openings at its edge, a ceramic reigniter plug across the outlet end of said combustion chamber, said reigniter plug having a plurality of openings therethrough adjacent its edge, an igniter shell threaded in said casting and having its interior in communication with said combustion chamber, and an electrical resistance wire igniter within said shell.

16. Combustion apparatus for internal combustion type heaters, comprising a body having a combustion chamber formed therein, means to draw a combustible mixture into said chamber and to withdraw the products of combustion therefrom, a baffle across the inlet of said chamber, said baffle having ports along its periphery, a reigniter having ports along its periphery and located across the outlet of said chamber, a cup-shaped igniter shell secured in the side of said body and having its interior in free communication with said chamber, and an electrical resistance wire igniter secured in said shell and effective when supplied with electrical energy to heat the combustible mixture to its ignition temperature.

17. Combustion apparatus for internal combustion type heaters, comprising a body having a combustion chamber formed therein, means to draw a combustible mixture into said chamber and to withdraw the products of combustion therefrom, a baffle across the inlet of said chamber, said baffle having ports along its periphery, a reigniter having ports along its perihery and located across the outlet of said chamber, a cup-shaped igniter shell secured in the side of said body and having its interior in free communication with said chamber, said shell having an aperture in its end, a stud extending through said aperture and insulated from said shell, and an igniter comprising a coil of high resistance wire having one end conductively secured to the inner end of said shell and having its other end conductively secured to the inner end of said stud.

18. In an automotive vehicle having a passenger compartment and an engine compartment separated by a wall, an internal combustion engine having an intake manifold located in the engine compartment, a fuel reservoir, a heat radiator, means for circulating air from said passenger compartment past said radiator, a connection from said radiator to the intake manifold of said engine, a heater carburetor located at a level above said fuel reservoir and supplied with fuel therefrom, a combustion chamber supplied with a mixture of air and fuel by said carburetor and connected to said radiator to supply heated gases thereto, electrical means for igniting the mixture in said combustion chamber, and a wall of slightly porous refractory material at one end of said combustion chamber in position to be heated by the gases of combustion in their course of flow to said radiator, said wall having apertures extending therethrough for the discharge of the gases of combustion from said chamber, said wall being adapted to be heated to a high temperature and to reignite the mixture in said combustion chamber should the flame therein become extinguished due to temporary failure of a sufficient supply of combustible mixture to said combustion chamber, a flow circuit including said carburetor, said combustion chamber, said radiator, and said intake manifold, and a manually operated valve in said flow circuit.

19. In a heater for an automobile having a passenger compartment and an engine compartment separated by a wall, an internal combustion engine having an intake manifold in which the degree of vacuum varies with variations in speed and power output of the engine, said heater comprising a radiator mounted adjacent said wall and having a passageway extending therethrough, a conduit connecting said passageway to the intake manifold of the engine, a motor driven fan for circulating air from the passenger compartment of the vehicle past said radiator, a casing for said radiator, means for supporting said casing from said wall, a combustion chamber secured to said radiator and to said casing, a carburetor located outside said casing and spaced sufficiently from said combustion chamber so as not to be appreciably heated thereby, means for supplying a liquid fuel to said carburetor, a flow circuit including said carburetor, said radiator, said conduit and said intake manifold, and a control valve in said flow circuit.

20. In a unit heater for an automobile having an internal combustion engine in an engine compartment, and a passenger compartment and a wall separating said compartments, the combination of a heat exchange device, means for securing said device to said wall, a motor driven fan for circulating air from the passenger compartment over said heat exchange device, a combustion chamber separate from but communicating with said heat exchange device to supply heated gases of combustion thereto, an apertured heat retaining means forming a partial obstruction and the means of communication between said combustion chamber and said heat exchange device, and means connected to the intake manifold of said internal combustion engine to produce a partial vacuum in said heat exchange device and thereby draw said gases of combustion through said device into the intake manifold.

21. An igniter for internal combustion type heaters, comprising an externally threaded shell having a relatively large opening at one end thereof and a relatively smaller aperture at the other end thereof, a terminal stud extending through said aperture and having a head inside said shell, means to insulate said stud from said shell, and a coil of high resistance wire having one end conductively secured to said shell adjacent the edge thereof defining said large opening and having its other end conductively secured to the head of said stud, said shell being of reduced cross sectional area adjacent said relatively large opening to reduce the rate of conduction of heat from said wire.

HENRY J. DE N. McCOLLUM.